KING & GOULD.
Neck Yoke.
No. 101,274.          Patented March 29, 1870.
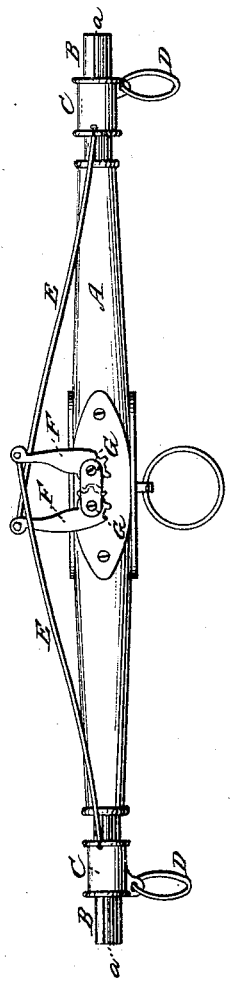

United States Patent Office.

JOSEPH KING AND CHARLES S. GOULD, OF JANESVILLE, WISCONSIN.

Letters Patent No. 101,274, dated March 29, 1870.

IMPROVEMENT IN NECK-YOKES.

The Schedule referred to in these Letters Patent and making part of the same.

*To all whom it may concern:*

Be it known that we, JOSEPH KING and CHARLES S. GOULD, of Janesville, in the county of Rock and State of Wisconsin, have invented a new and improved Neck-Yoke; and we do hereby declare that the following is a full, clear, and exact description thereof, which will enable others skilled in the art to make and use the same, reference being had to the accompanying drawings forming part of this specification.

The object of our invention is improvement in that class of neck-yokes in which the distinguishing feature is an arrangement of devices for allowing the rings, to which the neck-straps are attached, to move to or from each other, and so that they shall always be equidistant from the central point or pivot of the yoke; and The improvement consists in the construction and arrangement of parts whereby the ferrules, to which the rings are attached, are prevented from turning, and their distance apart regulated, as hereinafter set forth.

The drawing represents a side elevation of our improved neck-yoke.

A is the stock or main part of the neck-yoke, made in the usual or any approved way, except that the ends B are shaped, for a considerable distance, so that the ferrules or sleeves C may slide in and out, to admit the horses to approach or recede from each other, in picking their way along the road.

The said sleeves C support the rings D, through which the neck-straps are passed to suspend the neck-yoke. They are prevented from turning by the groove *a*, and the pins working in them.

These sleeves are connected, by rods E, with the cranks F, pivoted to the side of the neck-yoke near the center, having toothed faces, concentric with their pivots G, gearing with each other, so that the movements of each sleeve will be alike, and they will always be at equal distances from the center or the ends of the neck-yoke.

In this case the sleeves are connected with the arms opposite or beyond the center of the yoke.

This connection of the sleeves with the arms or cranks, gearing with each other, causes the yoke to be always suspended equally in respect to weight on each horse.

Having thus described our invention,

We claim as new and desire to secure by Letters Patent—

1. The toothed crank-arms F F, so arranged as to project forward when the neck-yoke is in use, and thus be out of the way of the animals composing the team, together with the rods E E, as shown and described.

2. The ferrules C C, provided with pins working in the grooves *a* in the reduced ends B of the yoke, as shown and described.

3. The ferrules C C, in combination with the grooved ends B B of the yoke, and with the rods E E, and toothed arms F F, all constructed, arranged, and operating as set forth and shown.

The above specification of our invention signed by us this 24th day of December, 1869.

JOSEPH KING.
CHARLES S. GOULD.

Witnesses:
N. DENSMORE,
S. WEBSTER,
H. B. STAFFORD.